US006614577B1

(12) United States Patent
Yu et al.

(10) Patent No.: US 6,614,577 B1
(45) Date of Patent: Sep. 2, 2003

(54) METHOD AND APPARATUS FOR CONTROLLING AN ELECTROCHROMIC DEVICE

(75) Inventors: Phillip C. Yu, Pittsburgh, PA (US); David L. Backfisch, Monroeville, PA (US); Charles R. Coleman, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 76 days.

(21) Appl. No.: 09/644,355

(22) Filed: Aug. 23, 2000

(51) Int. Cl.$^7$ .............................................. G02F 1/163
(52) U.S. Cl. ....................... 359/265; 359/275; 359/288; 351/44
(58) Field of Search ................. 359/265, 267, 359/275, 288; 351/44, 45; 345/105, 107

(56) References Cited

U.S. PATENT DOCUMENTS

| 4,466,270 | A | 8/1984 | Kimura et al. | |
| 4,729,235 | A | 3/1988 | Podlech | |
| 5,163,027 | A | 11/1992 | Miller et al. | |
| 5,231,531 | A | 7/1993 | Defendini et al. | 359/275 |
| 5,287,183 | A | 2/1994 | Thomas et al. | |
| 5,365,365 | A | 11/1994 | Ripoche et al. | 359/267 |
| 5,408,883 | A | 4/1995 | Clark, Jr. et al. | |
| 5,837,880 | A | 11/1998 | Shakinovsky et al. | |
| 5,973,818 | A | * 10/1999 | Sjursen et al. | 359/265 |
| 5,978,126 | A | * 11/1999 | Sjursen et al. | 359/265 |
| 6,222,177 | B1 | * 4/2001 | Bechtel et al. | 250/214 B |
| 6,236,049 | B1 | 5/2001 | Thomas et al. | |
| 6,246,505 | B1 | * 6/2001 | Teowee et al. | 359/241 |

FOREIGN PATENT DOCUMENTS

| DE | 197 06 918 A1 | 8/1998 | G02F/1/163 |
| EP | 568 457 A1 | 11/1993 | G02F/1/163 |
| JP | 02 216131 | 8/1990 | G02F/1/163 |
| WO | 97/28484 | 8/1997 | G02F/1/163 |

OTHER PUBLICATIONS

J.P. Matthews, J.M. Bell, I.L. Skryabin—"Effect of Temperature On Electrochromic Device Switching Voltages"; Electrochimica Acta 44 (1999) 3245–3250.

* cited by examiner

Primary Examiner—Hung Xuan Dang
Assistant Examiner—Tuyen Tra
(74) Attorney, Agent, or Firm—Dennis G. Millman; William C. Mitchell

(57) ABSTRACT

A method and apparatus for controlling a charge/discharge voltage applied to an EC device to ensure that an appropriate voltage drop across the EC device is maintained during charge and/or discharge modes of operation. The appropriate voltage drop is determined with respect to a temperature measurement proximate the EC device. The charge level of the device is monitored using a coulomb counter circuit having a topology designed to minimize interference in the operation of the EC device.

17 Claims, 4 Drawing Sheets

METHOD AND APPARATUS FOR CONTROLLING AN ELECTROCHROMIC DEVICE

The invention relates to the control of electrochromic devices, more particularly, the invention relates to a method and apparatus suitable for use in controlling a charge level of an electrochromic device.

BACKGROUND OF THE DISCLOSURE

The optical properties of electrochromic materials change in response to electrically driven changes in oxidation state. Thus, when an applied voltage from an external power supply causes reduction or oxidation of an electrochromic material, its transmittance properties change. In order to maintain charge neutrality, a charge balancing flow of ions in the electrochromic device is needed. By enabling the required electron and ion flows to occur, an electrochromic device utilizes reversible oxidation and reduction reactions to achieve optical switching.

Conventional electrochromic devices comprise at least one thin film of a persistent electrochromic material, i.e., a material which, in response to application of an electric field of given polarity, changes from a high-transmittance, non-absorbing state to a low-transmittance, absorbing or reflecting state. Since the degree of optical modulation is directly proportional to the charge transfer induced by the applied voltage, electrochromic devices demonstrate light transmission tunability between high-transmittance and low-transmittance states. In addition, these devices exhibit long-term retention of a chosen optical state, requiring no power consumption to maintain that optical state. Optical switching occurs when an electric field of reversed polarity is applied.

To facilitate the aforementioned ion and electron flows, an electrochromic film which is both an ionic and electronic conductor is in direct physical contact with an ion-conducting material layer. The ion-conducting material may be inorganic or organic, solid, liquid or gel, and is preferably an organic polymer. The electrochromic film(s) and ion-conductive material are disposed between two electrodes, forming a laminated cell.

When the transparent conductive electrode, adjacent to the electrochromic film, is the cathode, application of an electric current causes darkening of the film. Reversing the polarity causes electrochromic switching, and the film reverts to its high transmittance state. Typically, an electrochromic film such as tungsten oxide is deposited on a substrate coated with a transparent conductive film such as tin oxide or indium tin oxide to form one electrode.

Since an electrochromic device may be modeled as a non-linear passive device having an impedance dominated by a capacitive component, the amount of charge transferred to an electrochromic device is typically controlled by potential sources or current sources and current sinks.

In a known arrangement for controlling an EC device, an up/down counter is responsive to an up/down signal and a clock signal to produce a digital word representative of a desired EC charge level. Control logic is used to convert the digital word to a current source/sink programming signal suitable for causing a current source (or sink) to impart the desired charge level to the EC device.

Unfortunately, the above arrangement utilizes various components (e.g., current source and current sink transistors) having characteristics that tend to drift over time and temperature, thereby imparting more or less charge to the EC device than is otherwise indicated by the digital word produced by the up/down counter. In addition, EC devices themselves are subject to operational degradation over time and temperature. Moreover, the amount of energy required to charge an EC device is typically greater than the amount of energy required to discharge such a device. Thus, over a given period of time or temperature, an EC charge error may be accumulated such that the EC device may be significantly lighter or darker than desired.

A paper by J. P. Matthews et al., "Effect of Temperature on Electrochromic Device Switching Voltages," Electrochimica Acta 44 (1999), discloses that switching voltages needed to color electrochromic devices vary with temperature. However, the paper does not disclose or suggest a method or apparatus for maintaining the charge delivered to an electrochromic device at a predetermined level.

SUMMARY OF THE INVENTION

The instant invention is directed to a method for delivering a substantially constant, predetermined charge to an electrochromic device, said method having a voltage compensation or adjustment requirement feature relative to varying ambient temperatures, and to an apparatus for use in an electrochromic (EC) control system in which components causing the charging and discharging of an electrochromic device are subject to drift errors and other errors.

The invention controls a charge/discharge voltage (or current) profile applied to an EC device to ensure that an appropriate voltage drop across the EC device is limited and/or maintained during charge and/or discharge modes of operation. The appropriate voltage drop is determined with respect to a temperature measurement proximate (i.e., near, on or within) the EC device. since the charge/discharge rate is defined by the voltage drop, a factor in the selection of an appropriate voltage is the appropriate charge/discharge rate of the device being controlled. The charge level of the device is monitored using a coulomb counter circuit having a topology designed to minimize interference in the operation of the EC device.

The invention simultaneously controls the total charge applied to an EC device and the rate at which that charge is applied to the EC device over a functional temperature range to control the EC device within a stable electrochemical limit to provide a useful lifecycle durability. A maximum rate of charge transfer is selected to avoid secondary electrochemical reactions of the controlled EC device. In one embodiment, a minimum rate of charge transfer may be provided to ensure that a minimum desirable rate of operation of the controlled EC device is maintained.

Specifically, the instant invention is directed to a method for controlling the rate of charge delivered to, or removed from, an electrochromic device, while maintaining the charge delivered to, or removed from, the electrochromic device at a predetermined or programmed level, where each of a plurality of levels corresponds to respective bleached or colored states, as the temperature proximate (i.e., near, on or within) the device varies, the method comprising the steps of: (a) sensing the temperature proximate the device; and (b) adjusting the voltage or current applied to the device based on the temperature sensed in step (a).

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of controlling the charge level of an electrochromic device. However, it will be appreciated by those skilled in the art that since electrochromic devices form a subset of the broader category of electro-optic devices, the invention is equally applicable to other electro-optic devices, especially those that benefiting from a well-controlled charge and/or discharge methodology and apparatus, such as described below. Moreover, portions of the description referring to the charge transferred to a device intended to reflect that charge is transferred between electrodes that are located, for example, within the device. For purposes of this discussion, a device is primarily defined as an electro-optic (e.g., electrochromic) cell or cells having respective associated conductors used to transfer charge. The invention advantageously provides for the operation of an EO or EC device over a long period of time without a side reaction that visibly degrades the performance of the device.

Figure 1:
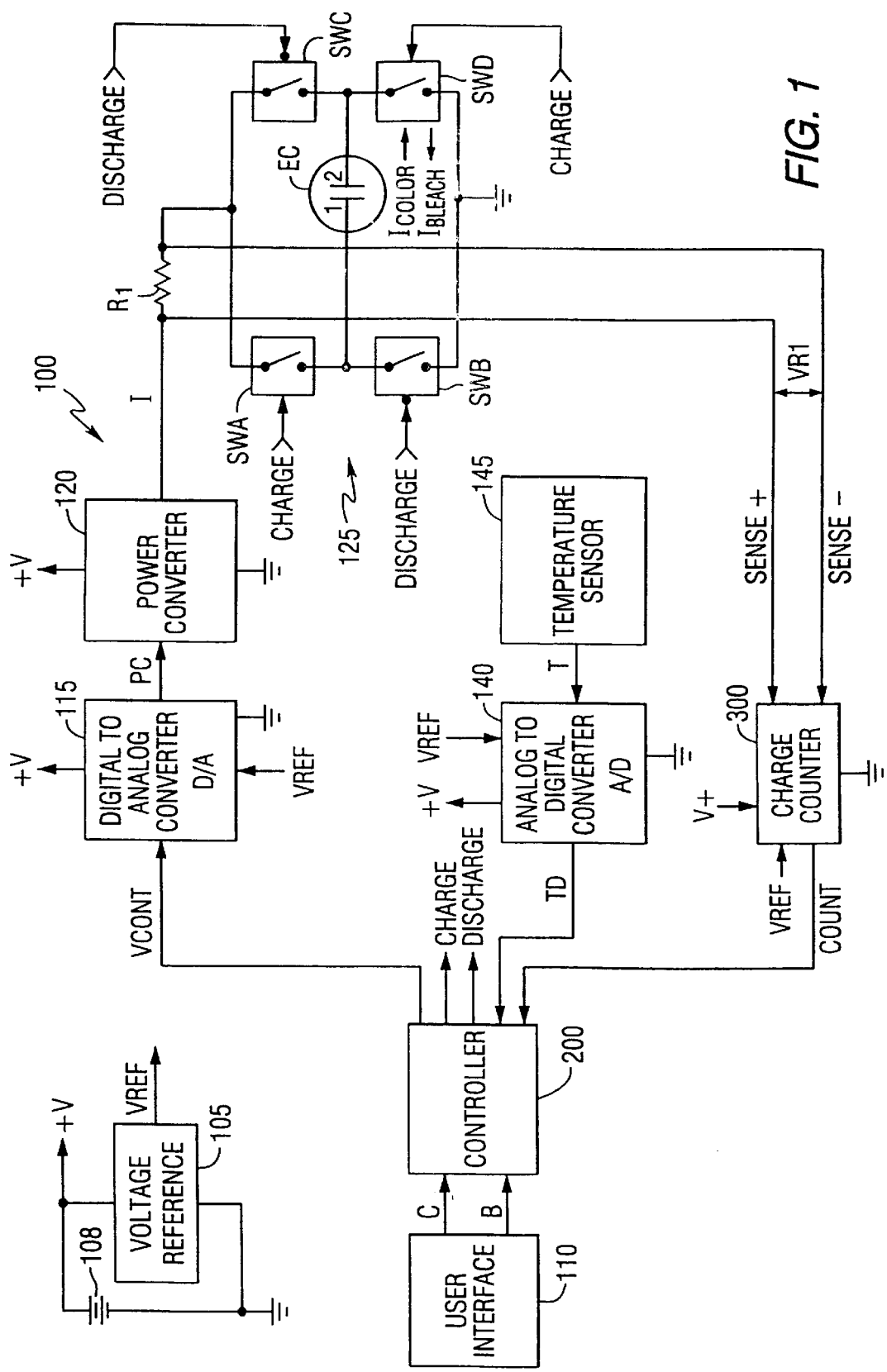
FIG. 1 depicts a block diagram of an electrochromic control apparatus.

FIG. 1 depicts an electrochromic control apparatus 100 including charge error correction apparatus according to the invention. The electrochromic control apparatus 100 is used to control the amount of charge imparted to an electrochromic device EC. Since the electrochromic device EC may be modeled as a non-linear passive device having an impedance dominated by a capacitive component, the electrochromic device EC is depicted in FIG. 1 as a capacitor having a first terminal (denoted as 1) and second terminal (denoted as 2).

In response to a coloring current $I_{COLOR}$ applied to the electrochromic device EC at the first terminal 1, the charge of the electrochromic device EC increases, thereby causing the device to darken. In response to a bleaching current $I_{BLEACH}$, the charge of the electrochromic device EC decreases, thereby causing the electrochromic device EC to lighten. One skilled in the art will readily recognize that the polarities of the coloring current $I_{COLOR}$ and the bleaching current $I_{BLEACH}$ may be reversed, depending on the connection and type of electrochromic device EC employed.

The electrochromic control apparatus 100 comprises a voltage reference 105, a battery 108, a user interface 110, a controller 200, a digital to analog (D/A) converter 115, a power converter 120, an analog to digital (A/D) converter 140, a temperature sensor 145, a charge counter 300, a polarity reversal circuit 125, a sensing resistor R1 and the electrochromic device EC to be controlled.

The battery 108 is used to provide all power within the apparatus 100. The battery has a positive terminal denoted as +V and a negative terminal denoted as ground. The voltage reference 105 is powered by the battery 108 and includes an output terminal for providing a controlled voltage reference signal VREF. The voltage reference signal VREF is coupled to the D/A converter 115, A/D converter 140 and charge counter 300.

The user interface 110 may comprise a series of push buttons or other user interface means suitable for providing information to controller 200 indicative of a desire to lighten (bleach) B or darken (color) C the electrochromic device EC. In response to the user interface signals B and C provided by the user interface 110, the controller 200 causes the electrochromic device EC to be lightened or darkened respectively.

The controller 200 provides a first output signal VCONT indicative of the maximum voltage limit to be applied to the electrochromic device EC. This voltage limit which is determined by the controller 200 is a function of temperature. The first output signal VCONT of the controller is converted to an analog power control signal PC by the D/A converter 115 and coupled to the power converter 120.

Power converter comprises a controllable voltage source 120. In response to an increase or decrease in the voltage level of power control signal PC, the power converter 120 respectively increases or decreases its output voltage. The input current drawn from the battery for use in the power conversion is limited by the power converter in order to prolong battery life. The output current I and output voltage V provided by the power converter 120 is coupled to the polarity reversal circuit 125 for subsequent application to the electrochromic device EC to effect a charging (darkening or coloring) or discharging (lightening or bleaching) of the electrochromic device EC. It should be noted that while power converter 120 is described as a controllable voltage source, in an alternate embodiment of the invention power converter 120 comprises a controllable current source. In either case, power converter 120 is controllably operated to adapt the charge or discharge level of the electrochromic device EC to an appropriate charge or discharge level.

The controller 200 provides a second output signal CHARGE indicative of a desired "charge" mode of operation, and a third output signal DISCHARGE indicative of a desired "discharge" mode of operation. The second CHARGE and third DISCHARGE control signals are coupled to the polarity reversal circuit 125.

The polarity reversal circuit comprises, illustratively, four switches SWA-SWD arranged in a bridge configuration to selectively couple the current I produced by the power converter 120 to the EC device in either the charge mode or the discharge mode of operation.

Each of switches SWA-SWD comprises a 1FormA (single pole single throw) switch having a respective input terminal, output terminal and control terminal. The output current I from power converter 120 is coupled to the input terminals of switches SWA and SWC. The output terminal of switch SWA is connected to the input terminal of switch SWB. The output terminal of switch SWC is connected to the input terminal of switch SWD. The output terminals of switches SWB and SWD are coupled to ground. The electrochromic device EC is coupled in series between the output terminals of switches SWA and SWC, in the known bridge configuration.

In the charge mode of operation, the control signal CHARGE is used to cause switches SWA and SWD to close, while the control signal DISCHARGE is used to cause switches SWB and SWC to open. In this mode of operation, the current flows from power converter 120 through, resistor R1, switch SWA, the electrochromic device EC and switch SWD to ground. During the charge mode of operation, current flowing through the electrochromic device EC imparts charge to the electrochromic device, thereby causing the device to darken or color.

In the discharge mode of operation, the control signal CHARGE is used to cause switches SWA and SWD to open, while the control signal DISCHARGE is used to cause switches SWB and SWC to close. In this mode of operation, the current flows from power converter 120 through resistor R1, switch SWC, the electrochromic device EC, and switch SWB to ground. During the discharge mode of operation, current flowing through the electrochromic device EC removes charge from the electrochromic device, thereby causing the device to lighten or bleach.

As previously noted, the electrochromic device EC may be characterized as a nonlinear device having both capacitive and resistive components. Therefore, the amount of charge imparted to the EC device is roughly defined by the equation: Q=CV, where Q is equal to the charge as measured in Coulombs, C is equal to capacitance of the EC device as measured in Farads, and V is equal to charging voltage as measured in Volts.

It is critical to note that an appropriate charging (or discharging) voltage for an electrochromic device is temperature dependent. Moreover, the appropriate charge and discharge voltage differs between various electro-optic and electrochromic devices, depending upon the EO or EC device construction. The appropriate charge and discharge voltage is bounded by minimum and maximum voltage levels, both of which are temperature dependent.

The appropriate voltage drop is determined with respect to a temperature measurement proximate (i.e., near, on or within) the EC device. since the charge/discharge rate is defined by the voltage drop, a factor in the selection of an appropriate voltage is the appropriate charge/discharge rate of the device being controlled. The charge level of the device is monitored using a coulomb counter circuit having a topology designed to minimize interference in the operation of the EC device. The inventors have recognized that the maximum voltage drop across the electrochromic device varies with temperature and that voltage drops beyond the allowed maximum will result in damage to the electrochromic device. It is further recognized that voltage drops below the voltage minimum at the specified temperature will degrade the desired product performance by increasing the charge and discharge time but will not damage the EC device. Advantageously, the subject invention controls the electrochromic device EC in a manner that adapts to temperature changes.

TABLE 1

| TEMP (F) | TEMP (C) | VOLTAGE MAX (COLOR) | VOLTAGE MIN (COLOR) |
|---|---|---|---|
| 66.2 | 19 | 1.267 | 1.237 |
| 68 | 20 | 1.255 | 1.225 |
| 69.8 | 21 | 1.244 | 1.214 |
| 71.6 | 22 | 1.233 | 1.203 |
| 73.4 | 23 | 1.222 | 1.193 |
| 75.2 | 24 | 1.212 | 1.183 |
| 77 | 25 | 1.203 | 1.174 |
| 78.8 | 26 | 1.193 | 1.166 |
| 80.6 | 27 | 1.185 | 1.158 |
| 82.4 | 28 | 1.177 | 1.150 |
| 84.2 | 29 | 1.169 | 1.143 |
| 86 | 30 | 1.161 | 1.136 |

Table 1 depicts a tabular representation of maximum and minimum coloring (charging) voltages for an exemplary electrochromic device based on temperature. Similarly, Table 2 depicts a tabular representation of maximum and minimum bleaching (discharging) voltages across exemplary electrochromic device depending on temperature. The negative polarity indication of the Table 2 voltages reflects the relative polarity of the discharge voltage applied to the EC device during the discharge mode of operation.

Referring to Table 1 and assuming an ambient temperature of 77F. (25C.), the maximum coloring voltage is 1.203 Volts, while the minimum coloring voltage is 1.174 Volts. That is, the current I passed through the electrochromic device during the charge mode of operation must produce a voltage drop having a minimum voltage of 1.174 Volts and a maximum voltage of 1.203 Volts. The controller 200 operates to ensure that these limits are adhered to. Similarly, at the same temperature a colored (i.e., charged) electrochromic device must be bleached at a minimum voltage of 0.529 Volts and a maximum voltage of 0.599 Volts

TABLE 2

| TEMP (F) | TEMP (C) | VOLTAGE MAX (BLEACH) | VOLTAGE MIN (BLEACH) |
|---|---|---|---|
| 66.2 | 19 | −0.730 | −0.650 |
| 68 | 20 | −0.706 | −0.627 |
| 69.8 | 21 | −0.683 | −0.605 |
| 71.6 | 22 | −0.660 | −0.584 |
| 73.4 | 23 | −0.639 | −0.565 |
| 75.2 | 24 | −0.618 | −0.546 |
| 77 | 25 | −0.599 | −0.529 |
| 78.8 | 26 | −0.580 | −0.513 |
| 80.6 | 27 | −0.563 | −0.498 |
| 82.4 | 28 | −0.546 | −0.484 |
| 84.2 | 29 | −0.530 | −0.472 |
| 86 | 30 | −0.515 | −0.461 |

Charge counter 300 senses the voltage VR1 across resistor R1, converts that voltage measurement into a quantized current measurement and provides indicia of that quantized current measurement to controller 200 as a counter signal via a count signal path. In this manner, controller 200 may determine the actual charge level of the electrochromic device EC. Therefore, the voltage across resistor R1 (VR1) is proportional to the charge or discharge current. The charge counter 300 uses this voltage to produce a current (I2, I3) proportional to the charge or discharge current I. That is, $$I_2 \propto I \frac{R_1}{R_2}.$$

The resulting current is used to repetitively charge and discharge a capacitor C2 having a known capacitance, such that each charge/discharge cycle of the known capacitor represents the imparting (or removing from) a predetermined quanta of charge from the EC device.

The charge counter 300 produces a pulse on an output signal path coupled to the controller 200 each time the charge level of the capacitor C2 exceeds an upper threshold level and each time the charge level of the capacitor C2 passes below a lower threshold level. The controller 200 responsively counts the number of pulses and stores the result in a counter storage location in a memory. In the case of the controller 200 causing the system to operate in the charge mode, received pulses are used to increment the counter location; in the case of the controller 200 causing the system to operate in the discharge mode, received pulses are used to decrement the counter location. Each pulse represents a quanta of charge ($\Delta q$), the number of quanta of charge (n) multiplied by the quanta of charge ($\Delta q$) equals the total charge, i.e. Q=nxn.$\Delta q$. The total charge represented by the counter is further scaled by the values of resistors R1, R2 and capacitor C2 and the gain of the sample and hold circuit.

Figure 3:
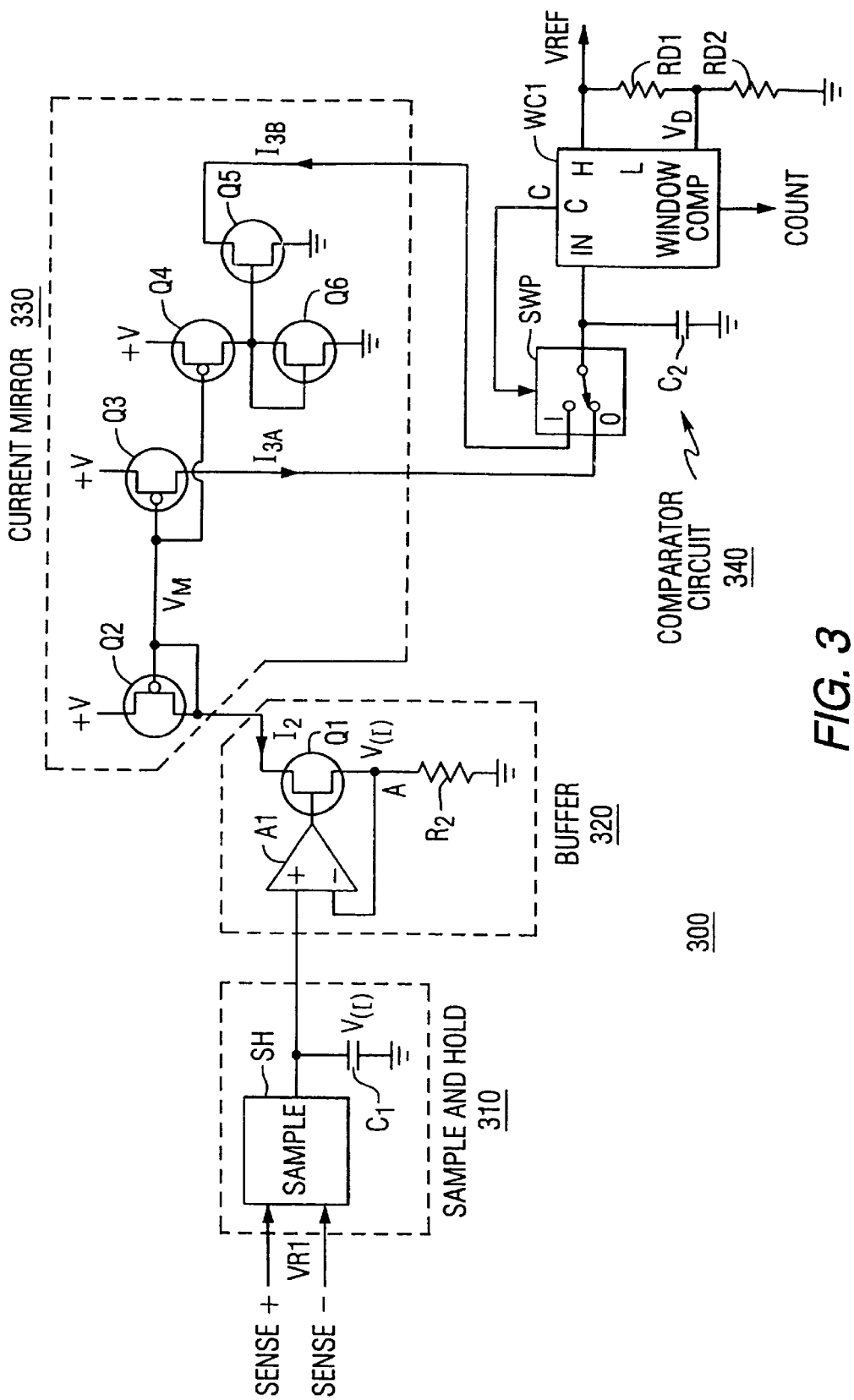
FIG. 3 depicts a circuit of a charge counter suitable for use in the electrochromic control apparatus of FIG. 1.

Temperature sensor 145 detects ambient temperature or, alternatively, the actual temperature of the electrochromic device EC. In the exemplary embodiment of FIG. 1, temperature sensor 145 provides a indicium, such as an analog indication, of that temperature to A/D converter 140. A/D converter 140 responsively converts that analog temperature signal T to a digital temperature word or signal TD that is coupled to the controller 200 for further processing. It is noted that the temperature sensor 145 may be located near, on or within the EC device. The above-described embodiment of the invention contemplates the use of a power converter 120 comprising a controllable voltage source. That is, the control signal PC controls the output voltage of the power converter 120 such that the voltage drop across the electrochromic device EC causes a current to pass through the electrochromic device proportional to the impedance of the electrochromic device. As previously noted, it is also contemplated that power converter 120 may be a controllable current source. That is, the control signal PC controls the output current of the power converter 120 such that the current flowing to the EC device is determined with respect to the control signal PC. In a preferred embodiment of the invention utilizing a battery, the power converter 120 comprises a controllable voltage source. Within the context of battery powered operation, a controllable voltage source is desirable because the output voltage of the power converter 120 may be reduced as necessary to insure that the current drawn from the battery does not exceed a predefined upper limit. In this manner, a topology utilizing a controllable voltage source power converter 120 advantageously adapts the teachings of the present invention to the realities of batteries having finite current sourcing capabilities. FIG. 3 depicts a schematic diagram of a charge counter circuit suitable for use in the electrochromic control system of FIG. 1. Specifically, the charge counter circuit 300 comprises a sample and hold circuit 310, a buffer 320, a current mirror circuit 330 and a comparator circuit 340. Charge counter 300 senses the voltage VR1 across resistor R1, converts that voltage measurement into a quantized current measurement and provides indicia of that quantized current measurement to controller 200 via a count signal path. By determining this charge, the controller 200 of the present invention may more accurately provide appropriate bleaching and/or darkening of the electrochromic device.

The sample and hold circuit 310 operates to sample the voltage across resistor R1 and hold the sampled voltage on a capacitor with one side referenced to ground point. It should be noted that resistor R1 is floating with respect to ground. Sample and hold circuit 310 comprises a sample and hold module SH and a capacitor C1. The sample and hold module SH receive the positive sense line SENSE+ and negative sense line SENSE− from the resister R1. The sample and hold module periodically samples the voltage across resister R1 provided via the sense lines SENSE+ and SENSE− to produce a sampled voltage V(I). The capacitor C1 is coupled between the output of sample and hold module SH and ground. Capacitor C1 operates to store, or hold, the sampled voltage V(I) produced by sample and hold module SH. The sampled voltage V(I) is proportional to the sampled current through electrochromic device EC.

Buffer 320 comprises a unity gain buffer that buffers the output of sample and hold circuit 310 and produces a current I2 proportional to the sampled voltage V(I). Specifically, buffer 320 comprises an operational amplifier A1, a transistor Q1 and a resistor R2. Operational amplifier A1 receives the sampled voltage V(I) at a positive input terminal. Operational amplifier A1 has a negative input terminal connected to an output terminal of transistor Q1, and an output terminal connected to a control terminal of transistor Q1. Resistor R2 is coupled between the output terminal of transistor Q1 and ground. An input terminal of transistor Q1 receives a current I2 from current mirror 330.

Unity gain buffer 320 operates to keep the voltage across resistor R2 substantially the same as the voltage across resistor R1 (i.e., V(I)). The voltage across R2 is proportional to the voltage across R1, and is kept substantially the same where the gain of the differential amplifier within the sample and hold circuit is 1. In this manner, current I2 is proportional to the current I passing through the electrochromic device EC of FIG. 1.

Current mirror 330 comprises five transistors (Q2–Q6), each of which have an input terminal, an output terminal and a control terminal. Transistor Q2, illustratively a PMOS transistor, has its input terminal coupled to V+ and its control and output terminals coupled together such that transistor Q2 forms a current source. The current I2 produced by the voltage drop across transistor Q2 is provided to buffer circuit 320. As previously noted, buffer circuit 320 controls I2 such that the voltage across resistor R2 is equal to the voltage across resistor R1. Therefore, current I2 approximates the current through the electrochromic device EC of FIG. 1.

The control terminal of transistor Q2 is also coupled to respective control terminals of transistors Q3 and Q4, both of which comprise PMOS transistors. Transistors Q3 and Q4 have input terminals coupled to V+. An output terminal of transistor Q3 is coupled to a first input of a 1FormC (single pole double throw) switch SWP within comparator circuit 340.

The output terminal of transistor Q4 is coupled to the input terminal of transistor Q6 and the control terminals of transistors Q5 and Q6. The output terminals of transistor Q6 and Q5 are both connected to ground. The input terminal of transistor Q5 is connected to a second input terminal of the 1FormC switch SWP in comparator circuit 340.

The current mirror circuit 330 produces, in addition to current I2, a pair of additional currents denoted as I3A and I3B. I3A is a current sourced from the output terminal of transistor Q3, I3B is a current sunk by the input terminal of transistor Q5. Current I3A flows to an output of switch SWP when the switch SWP is in "zero" position, while current I3B flows from the output of switch SWP when the switch SWP is in "one" position.

Comparator circuit 340 comprises the 1FormC switch SWP, the capacitor C2, a window comparator WC1, and a pair of divider resistors RD1 and RD2. As previously noted, the first input (input 0) of switch SWP is coupled to the output terminal transistor Q3, while the second input (input 1) of switch SWP is connected to the input terminal of transistor Q5. The output terminal of switch SWP is coupled to an input terminal IN of the window comparator WC1. The capacitor C2 is coupled between the output terminal of switch SWP and ground.

A high reference input H of window comparator WC1 is coupled to the voltage reference VREF. The resistors RD1 and RD2 are coupled in series in the order named between the voltage VREF and ground. A low reference input L of window comparator WC1 is coupled to the junction of resistors RD1 and RD2, where a reference voltage VD is formed by dividing the reference voltage VREF. The window comparator WC1 compares the voltage at its input terminal IN to the voltages at its high H and low L reference input terminals. For purposes of this discussion it will be assumed that VREF is equal to 1.5 Volts and VD is equal to 1.0 Volts.

As the current I of FIG. 1 begins to flow through the electrochromic device EC and the resistor R1, the voltage across R1 increases proportionately. Thus, the voltage across capacitor C1 of sample and hold circuit 310 begins to increase, resulting in an increase in current I2 to the buffer circuit 320. This causes an increase in current I3A which passes through switch SWP (selecting terminal 0 at this time) and through capacitor C2, charging capacitor C2. As the voltage across capacitor C2 increases through the high reference voltage (e.g., 1.5 Volts), the control output C of window comparator WC1 changes from 0 to 1, thereby causing switch SWP to select terminal 1 rather than terminal 0 to be coupled to the output of the output of the switch. This causes capacitor C2 to be discharged through transistors Q5 and Q6 via current I3B. As capacitor C2 is discharged the voltage across C2 decreases. When the voltage across capacitor C2 decreases to the divider voltage VD provided to the low reference input of the window comparator WC1, the control output of the window comparator WC1 transitions from 1 to 0, causing switch SWP to couple the 0 input to the switch output. In this manner, currents I3A and I3B repetitively charge and discharge capacitor C2.

Each time that capacitor C2 is charged to the voltage reference level at the high input terminal (e.g., 1.5 Volts) a low to high logic transition is sent to the controller 200 via the signal path COUNT. Similarly, each time capacitor C2 is discharged by current I3B to the voltage VD of the low reference input, high to low logic transition is sent to the controller 200 via the signal path COUNT. Thus, for every two logic transitions (one pulse) sent to the controller 200, the controller 200 determined that the charge of the EC device has increased (charge mode) or decreased (discharge mode) by an amount of charge related to the high and low reference voltages and the capacitance of C2.

Charge within a capacitor is defined by the formula Q=CV, where Q is equal to charge as measured in Coulombs, C is equal to capacitance as measured in farads and V is equal to voltage as measured in Volts. Since charge counter 300 provided 1 pulse for each change in voltage level of capacitor C2 from 1 V to 1.5 V and back to 1 V, each pulse from the charge counter is equal to a charge of (0.5 v)C+(0.5 V) C=(1 V)C. In the case of a 1 farad capacitor, therefore, each pulse is equal to 1 Coulomb. In a more like scenario of a much smaller capacitor, such as a 0.1 microfarad capacitor each pulse is equal to 0.1 micro Coulomb.

Thus, the charge level of the electrochromic device ($Q_{EC}$) is approximately defined by the following equation:

$$C_{REF}*2(V_H-V_L)*\text{COUNT}$$

where:

$C_{REF}$ is the capacitance of the reference capacitor C2;

COUNT is the charge per packet;

$V_H$ is the upper threshold voltage of the window comparator; and $V_L$ is the lower threshold voltage of the window comparator.

In an alternate embodiment of the invention, the charge level of the electrochromic device ($Q_{EC}$) is approximately defined by the following equation:

$$Q_{EC}=C_{REF}\times(\text{COUNT})\times(V_H-V_L)$$

In this embodiment of the invention, the above relationship is true only if the absolute value of $I_3$ is equal to the absolute value of $I_{EC}$, which is equal to the absolute value of $V_{r1}$ divided by $R_1$. In this embodiment of the invention $R_1$ is not equal to $R_2$ and, therefore, $I_{EC}$ is not equal to $I_2$ or $I_3$. Thus, $Q_{EC}=K\times C_{REF}\times\text{COUNT}\times(V_H-V_L)$, where K is a constant of proportionality equal to $R_2$ divided by $R_1\times A_{SH}$, where $A_{SH}$ is the voltage gain of the differential input sample and hold circuit 310, which is equal to 1 in the present embodiment of the invention, by varying the differential input sample and hold voltage gain to a value other than 1, the alternate calculation for $Q_{EC}$.

In the exemplary embodiment of FIG. 3 transistors Q1, Q5 and Q6 comprise NMOS transistors, while transistors Q2–Q4 comprise PMOS transistors. It would be appreciated by those skilled in the art that other transistors may be used and that other circuit topologies may be used to achieve similar functions. Additionally, while the current $I_2$ is proportional to the current I, it should be noted that $I_2$ is much less than I. Therefore, the capacitor $C_2$ may be much less than the capacitance of the electrochromic device EC. In this manner, the amount of power required to implement the present invention is reduced.

Figure 2:
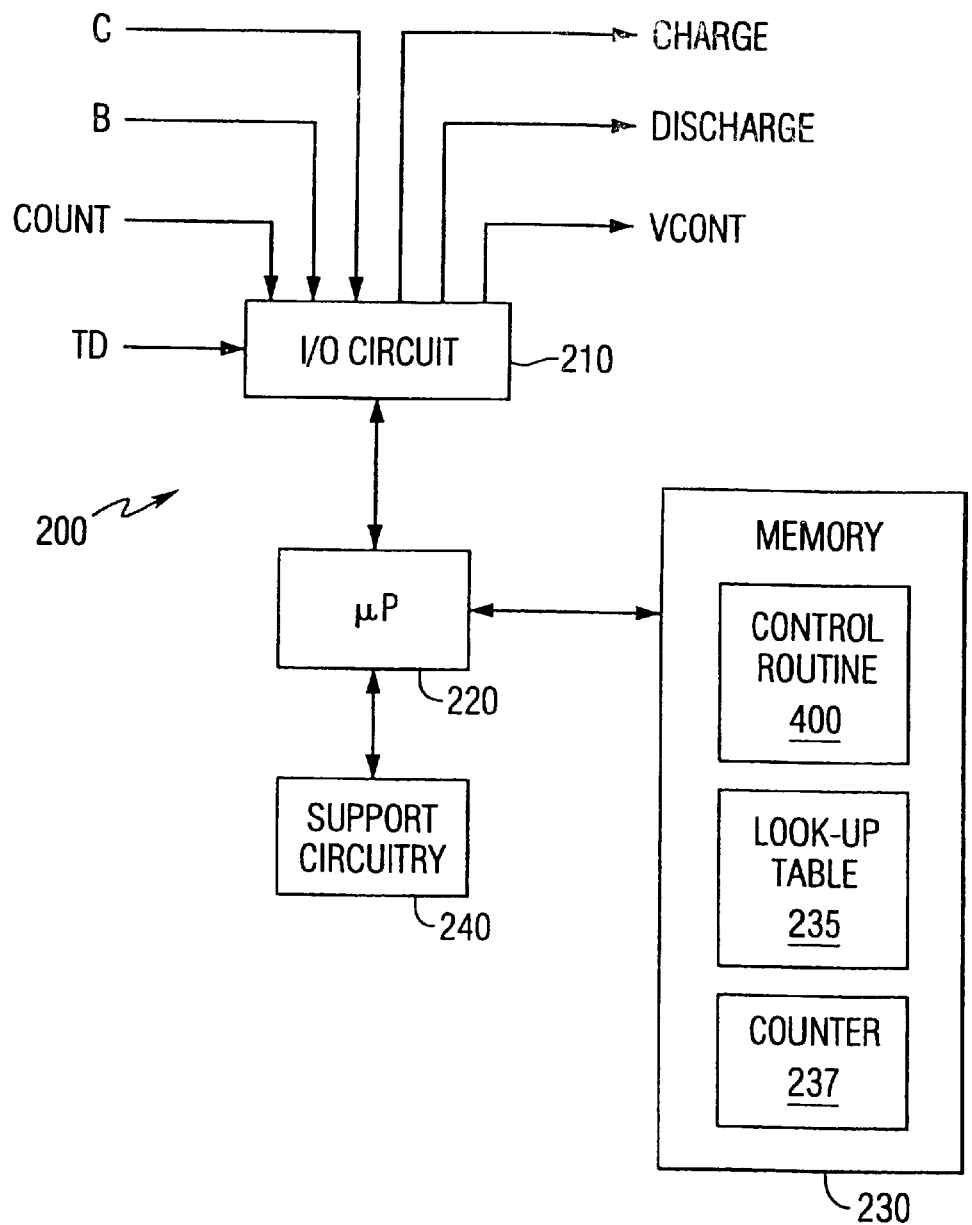
FIG. 2 depicts an embodiment of a controller suitable for use in the electrochromic control apparatus of FIG. 1.

FIG. 2 depicts an embodiment of a controller suitable for use in the electrochromic control apparatus of FIG. 1. Specifically, the controller 200 of FIG. 2 comprises a microprocessor 220 as well as memory 230 for storing an EC control method 400, at least one look-up table 235 and a counter variable 237. The microprocessor 220 cooperates with conventional support circuitry 240 such as power supplies, clock circuits, cache memory and the like as well as circuits that assist in executing the software methods. As such, it is contemplated that some of the process steps discussed herein as software processes may be implemented within hardware, e.g., as circuitry that cooperates with the microprocessor 220 to perform various steps.

The EC controller 200 also comprises input/output circuitry 210 that forms an interface between the microprocessor 220 and the user interface 110, D/A converter 115, A/D converter 140, charge counter 300 and polarity reversal switches SWA-SWD of FIG. 1.

Although the EC control apparatus 200 is depicted as a general purpose computer that is programmed to perform EC control functions in accordance with the present invention, the invention can be implemented in hardware as an application specific integrated circuit (ASIC). As such, the process steps described herein are intended to be broadly interpreted as being equivalently performed by software, hardware, or a combination thereof.

The controller 200 of the present invention executes an EC control method 400 that will now be described with respect to FIG. 4.

Figure 4:
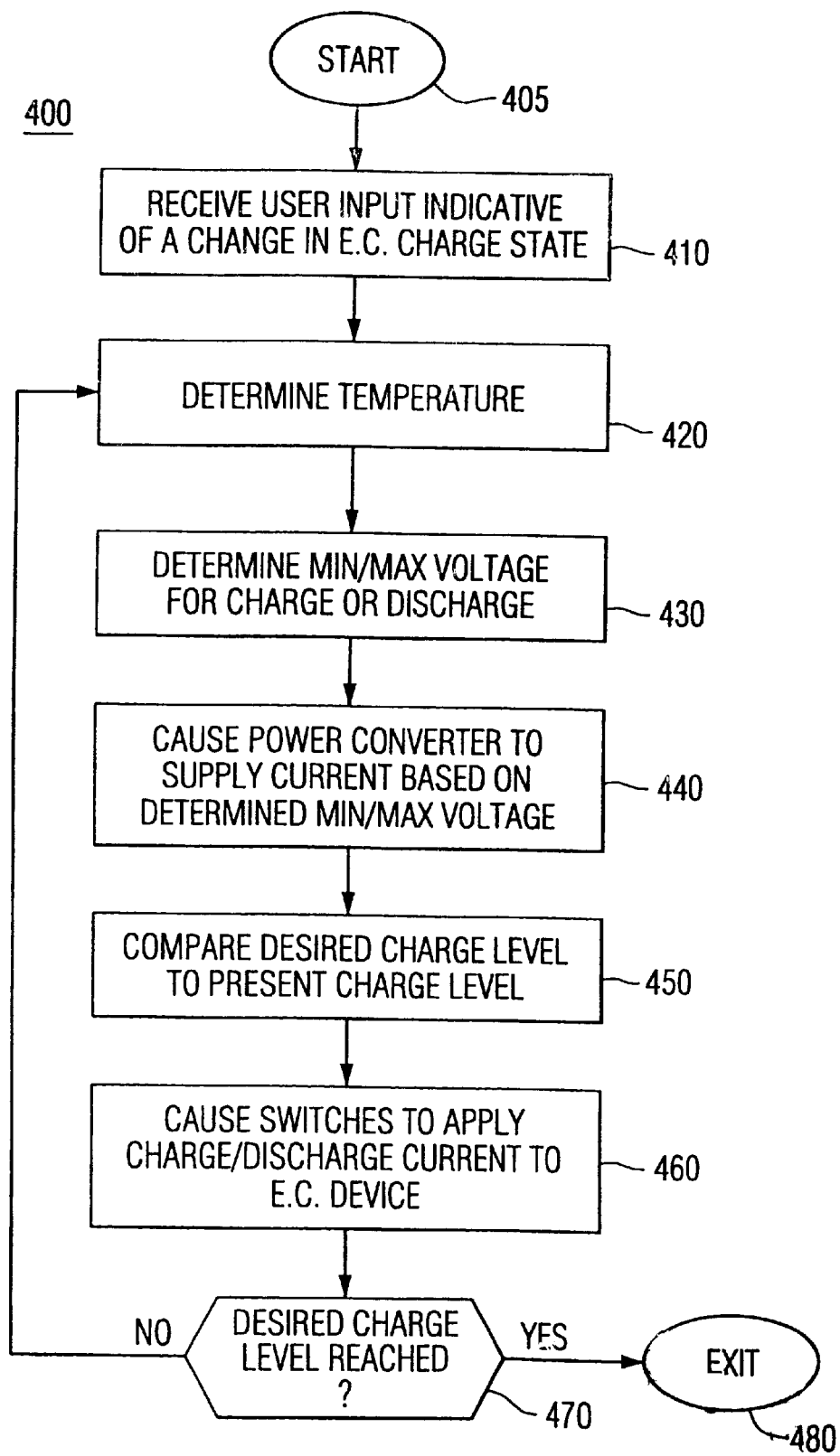
FIG. 4 depicts a flow diagram of a control method suitable for use in the electrochromic control apparatus of FIG. 1 and the controller of FIG. 2.

FIG. 4 depicts a flow diagram of a control method suitable for use in the controller 200 of FIG. 1 and FIG. 2. Specifically, FIG. 4 depicts a flow diagram of a method 400 for adapting a charge level of a electrochromic device in response to user input and further in response to temperature, determined appropriate charge voltage and actual charge level of the electrochromic device. The temperature may be provided by, for example, temperature sensor 145; the actual charge level may be provided by, for example, calculations made using the indicia of EC device charge quanta increase or decrease provided by charge counter 300; and appropriate charge voltage may be determined with respect to the temperature information and a look-up table relating the temperature information to the EC device being controlled.

The method 400 of FIG. 4 is entered at step 405 where the counter variable is initialized to zero, and the EC device is assumed to have no charge. The method 400 then proceeds to step 410.

At step 410, user input indicative of a change in electrochromic charge state is received. The method 400 then proceeds to step 420.

At step 420, the controller 200 determines the ambient temperature or electrochromic device temperature. The method 400 then proceeds to step 430.

At step 430 the minimum and maximum charge or discharge voltage is determined based upon the temperature determined at step 420 and the contents of the look-up table 235. The method 400 then proceeds to step 440.

At step 440, the controller 200 causes the power converter 120 to supply a current I based on the determined minimum and maximum charge or discharge voltage level. The method 400 then proceeds to step 450.

At step 450, the desired EC charge level is compared to the present EC charge level. That is, at step 450 the desired charged level as indicated by the user input received at step 410 is compared to the present charge level of the electrochromic device EC. The present charge level is determined with respect to the count signal COUNT provided by the charge counter of 300. As previously discussed, the charge counter 300 outputs a series of pulses to the controller 200 where each pulse indicates a predefined increase or decrease in charge level of the electrochromic device. Thus, by maintaining a count of pulses provided by charge counter 300 and by increasing that count in response to pulses received during a charge mode while decreasing that count in response to pulses received during a discharge mode, the controller 200 is able to determine the present charge level of the electrochromic device EC. The method 400 then proceeds to step 460.

At step 460, the controller 200 causes the polarity reversal circuit to apply the appropriate charge or discharge current to the electrochromic device EC. The method 400 then proceeds to step 470.

At step 470, a query is made as to whether a desired charge level has been reached. That is, as step 470 the present charge level as indicated by the charge counter 300 is compared to the desired charged level to determine whether the electrochromic device is at an appropriate charge level (i.e., an appropriate bleached or color level). If the query at step 470 is answered affirmatively, then the method 400 proceeds to step 480 where it is exited. If the query at step 470 is answered negatively, then the method 400 repeats steps 420–470.

The above-described invention is particularly well suited for battery powered electrochromic device applications, such for controlling the charge level of electrochromic coatings on lenses in, e.g., a pair of eyewear or eyeglasses (i.e., sunglasses). The invention also finds applicability in areas such as automotive, architectural and aircraft glass and/or glazing, advertising displays and the like.

In one embodiment, the electro-optic or electrochromic device optically cooperates with a lens(es) (prescription or other), a vehicle windshield. a window pane, an aircraft transparency or other transparent or translucent material. In an eyewear embodiment, an eyewear housing includes a controller for executing control methods according to the invention as well as a power source for providing a charging voltage or current. The power source may comprise a battery, a fuel cell, a solar cell or any other power source capable of providing the appropriate charging voltage or current. Preferably, the power source is small enough to fit inside the form factor defined by the eyewear or a helmet including the eyewear. A wearable power source is also contemplated by the inventors.

It should be noted that a maximum charge level is preferably selected to avoid browning or bubbling of the EO or EC device, while a minimum charge level is selected to provide a minimum rate of chromatic change of the EO or EC device. Thus, the maximum charge level is selected to avoid device damage, while the minimum charge level is selected to meet a minimum consumer expectation with respect to product performance including the controlled EC device.

The above-described embodiments of the invention, and other embodiments that will now be apparent tot hose skilled in the art, controls the total charge applied to an EC device and the rate at which that charge is applied to the EC device over a functional temperature range to control the EC device within a stable electrochemical limit and thereby provide a useful lifecycle durability. A maximum rate of charge transfer is selected to avoid secondary electrochemical reactions of the controlled EC device. In one embodiment, a minimum rate of charge transfer may be provided to ensure that a minimum desirable rate of operation of the controlled EC device is maintained.

Although various embodiments which incorporate the teachings of the present invention have been shown and described in detail herein, those skilled in the art can readily devise many other varied embodiments that still incorporate these teachings.

What is claimed is:

1. Apparatus for controlling a charge state of an electrochromic (EC) device, comprising:

a controllable voltage source, for providing a charging voltage to said EC device;

a temperature sensor, for providing an indicium of a temperature proximate said EC device; and a controller, for determining, in response to said temperature indicium, an appropriate voltage to be applied to said EC device by said controllable voltage source, said determined voltage defining a rate of charge.

2. The apparatus of claim 1, further comprising:

a charge counter, for counting charge quanta imparted to said EC device;

said controller causing said controllable voltage source to stop producing said charging voltage when said charge quanta imparted to said EC device reaches a desired level.

3. The apparatus of claim 2, further comprising:

a polarity reversal circuit, for selectively applying said appropriate voltage produced by said controllable voltage source to said EC device as one of a charge current and a discharge voltage.

4. The apparatus of claim 3, wherein said charge counter comprises:

a current mirror, for producing a reference current It proportional to said charge current produced by said controllable voltage source; and a switch, selectively coupling said reference current to a capacitor, for repeatedly causing said capacitor to be charged to a first threshold level and discharged to a second threshold level by said reference current;

wherein a pulse is provided to said controller each time said capacitor is charged to said first threshold level and each time said capacitor is discharged to said second threshold level.

5. The apparatus of claim 4, further comprising:

a counter, said counter being incremented in response to pulses provided during a charge mode and decremented in response to pulses provided during a discharge mode, said count being indicative of a present charge level of said EC device.

6. The apparatus of claim 5, wherein said charge level of said EC device $Q_{EC}$ is approximately defined by the following equation:

$$C_{REF}*2(V_H-V_L)*\text{COUNT}$$

where:

$C_{REF}$ is the capacitance of the reference capacitor;

COUNT is the presently stored counter value;

$V_H$ is the first threshold level; and $V_L$ is the second threshold level.

7. The apparatus of claim 1, wherein:

said controllable voltage source provides a charging voltage across said EC device; and said appropriate voltage to be produced by said controllable voltage source comprises a charging voltage bounded by a minimum charge voltage and a maximum charge voltage, said minimum and maximum charging voltages being temperature dependent.

8. The apparatus of claim 7, wherein said maximum charge level is selected to avoid browning or bubbling of said EC device.

9. The apparatus of claim 8, wherein said appropriate charge voltage is bounded by a minimum charge voltage and a maximum charge voltage, said minimum and maximum charging voltages being temperature dependent.

10. The apparatus of claim 7, wherein said minimum charge level is selected to provide a minimum rate of chromatic change within said EC device.

11. Apparatus for controlling a charge state of an electrochromic (EC) device, said electrochromic device receiving a charging current, said apparatus comprising:

a reference resistance, coupled to receive a reference current proportional to said charging current, said reference resistance having a known resistance relationship with said electrochromic device;

a window comparator, coupled to said reference impedance, for comparing a voltage level of said reference impedance to upper and lower threshold levels and producing an output signal indicative of said comparison; and a controller, coupled to said window comparator, for determining a charge level of said EC device using said window comparator output signal;

a temperature sensor, for determining a temperature proximate said electrochromic device;

said controller, in response to said determined temperature, determining an appropriate charging voltage for said EC device and adapting said charging voltage to said appropriate charging voltage.

12. In eyewear having a lens portion optically cooperating with an electrochromic material, apparatus for controlling a charge state of said electrochromic material, comprising:

a controllable current source, for providing a current to said electrochromic device;

a charge counter, for counting charge quanta imparted to said electrochromic device;

a temperature sensor, for providing an indicium of a temperature proximate said electrochromic device; and a controller, for determining, in response to said temperature indicium, an appropriate voltage to be produced by said controllable current source;

said controller causing said current source to stop producing said current when said charge quanta imparted to said electrochromic device reaches a desired level.

13. The apparatus of claim 12, further comprising:

a polarity reversal circuit, for selectively applying said current produced by said controllable current source to said electrochromic device as one of a charge current and a discharge current.

14. The apparatus of claim 12, wherein said charge counter comprises:

a current mirror, for producing a reference current proportional to said current produced by said controllable current source; and a switch, selectively coupling said reference current to a capacitor, for repeatedly causing said capacitor to be charged to a first threshold level and discharged to a second threshold level by said reference current;

wherein a pulse is provided to said controller each time said capacitor is charged to said first threshold level and each time said capacitor is discharged to said second threshold level.

15. The apparatus of claim 14, further comprising:

a counter, said counter-being incremented in response to pulses provided during a charge mode and decremented in response to pulses provided during a discharge mode, said count being indicative of a present charge level of said electrochromic device.

16. The apparatus of claim 14, wherein said charge level of said electrochromic device $Q_{EC}$ is approximately defined by the following equation:

$$C_{REF}*2(V_H-V_L)*\text{COUNT}$$

where:

$C_{REF}$ is the capacitance of-the reference capacitor;

COUNT is the presently stored counter value;.

$V_H$ is the first threshold level; and $V_L$ is the second threshold level.

17. The apparatus of claim 12, wherein:

said controllable current source induces a charging voltage across said electrochromic device; and said appropriate current to be produced by said controllable current source comprises a current that produces a charging voltage bounded by a minimum charging voltage and a maximum charging voltage, said minimum and maximum charging voltages being temperature dependent.

* * * * *